United States Patent [19]

Gaiser

[11] Patent Number: 4,604,866
[45] Date of Patent: Aug. 12, 1986

[54] MASTER CYLINDER

[75] Inventor: Robert F. Gaiser, Stevensville, Mich.
[73] Assignee: Allied Corporation, Morristown, N.J.
[21] Appl. No.: 647,774
[22] Filed: Sep. 6, 1984
[51] Int. Cl.[4] .............................................. F15B 7/00
[52] U.S. Cl. ....................................... 60/535; 60/545; 60/561; 60/562; 60/585; 60/592
[58] Field of Search .................. 60/545, 561, 535, 534, 60/585, 592, 562; 340/52 C

[56] References Cited

U.S. PATENT DOCUMENTS

| 3,560,918 | 2/1971 | Lewis | 340/52 C |
| 3,708,211 | 1/1973 | Bueler | 340/52 C |
| 3,852,962 | 12/1974 | Warwick | 60/535 |
| 4,084,377 | 4/1978 | Gaiser | 60/535 |
| 4,301,653 | 11/1981 | Carre | 60/535 |
| 4,337,792 | 7/1982 | Nomura | 60/535 |

FOREIGN PATENT DOCUMENTS

| 123557 | 9/1980 | Japan | 60/535 |
| 1486208 | 9/1977 | United Kingdom | 60/535 |
| 2064692 | 6/1981 | United Kingdom | 60/535 |

Primary Examiner—Abraham Hershkovitz
Attorney, Agent, or Firm—Ken C. Decker

[57] ABSTRACT

A master cylinder includes a housing movably supporting a pair of pistons and carrying a fluid reservoir assembly. The fluid reservoir assembly carries a differential area piston and a float which cooperate to activate a single reed switch, thereby generating a warning signal for a vehicle operator.

13 Claims, 4 Drawing Figures

MASTER CYLINDER

The present invention relates to a master cylinder which is operable during braking to generate fluid pressure for communication to separate brake circuits. The master cylinder is further provided with a fluid level indicator and pressure failure indicator to generate a warning signal for a vehicle operator.

Heretofore, a master cylinder included a fluid level indicator and a pressure failure indicator which required modification of a master cylinder housing to accomodate a probe extending into a housing opening. The probe detected movement of a piston in the housing opening. Alternatively, the master cylinder housing was used as a part of the electric circuit for the indicators and warning signal. These attempts at integrating a fluid level indicator and a pressure failure indicator were not widely accepted by vehicle manufacturers. Examples of prior art master cylinders are illustrated in U.S. Pat. No. 4,084,377; U.S. Pat. No. 3,560,918 and Australian Patent Specification No. 34136/68.

The present invention teaches a master cylinder with a fluid level indicator and a pressure failure indicator that are compactly arranged without substantial modifications to a master cylinder housing.

The present invention covers a master cylinder comprising a housing movably receiving a pair of pistons in order to develop fluid pressure in a pair of pressure chambers during braking, a reservoir assembly carrying fluid for communication to the pair of pressure chambers in a rest position, a differential piston exposed to the pair of pressure chambers and operable during braking to actuate a signal circuit in response to a failure mode in either pressure chamber, a float disposed in the reservoir assembly in order to also actuate the signal circuit in response to the fluid level in the reservoir assembly falling below a predetermined amount and a reed switch or the like controlling the signal circuit, characterized in that said reservoir assembly defines a first bore extending from a front end to a rear end for receiving said differential piston, said reservoir assembly defines a second bore extending transversely to said first bore for receiving said reed switch or the like, said float carrying a first magnet for disposition adjacent said second bore when the fluid level is below the predetermined amount, and said differential piston carrying a second magnet and a third magnet which are normally equally spaced from said reed switch in the absence of a failure mode.

It is an advantage of the present invention that the reed switch is strategically located to pick up a signal for the float and the differential piston. Furthermore, the reservoir assembly accomodates the differential piston, the float and the reed switch so that the reservoir assembly can be tested separate from the master cylinder housing.

In the accompanying drawings.

Figure 1:
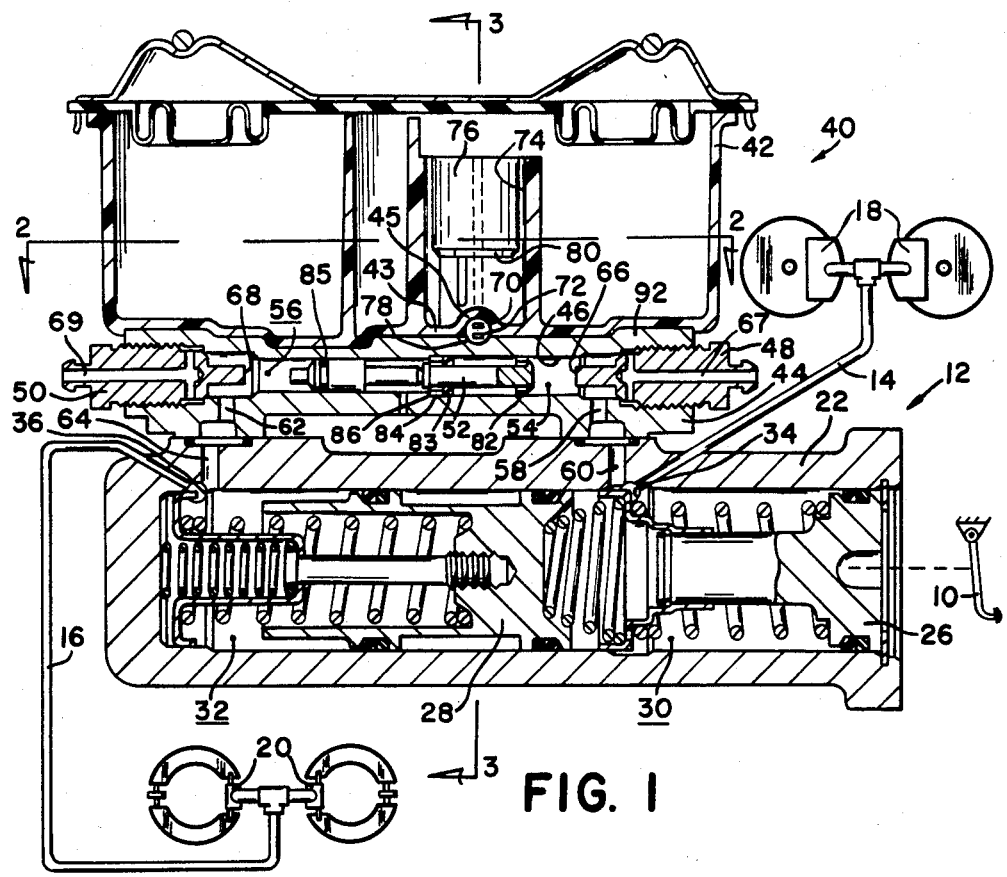
FIG. 1 is a side cross sectional view of a master cylinder in a brake system.

A brake system includes a brake pedal 10 which is operated by a driver of a vehicle to control braking for the vehicle. The pedal 10 is connected to a master cylinder 12 to generate fluid pressure therein during braking and a pair of conduits 14 and 16 communicate the fluid pressure to a pair of brakes 18 and 20. The master cylinder 12 includes a housing 22 with an opening 24 movably receiving a pair of pistons 26 and 28 which cooperate with the housing to form a pair of pressure chambers 30 and 32. The pistons 26 and 28 cooperate with a pair of tilt valves as illustrated in U.S. patent application Ser. No. 432,592 filed Oct. 4, 1982; however, for the sake of clarity the tilt valves are not illustrated. Each pressure chamber 30 and 32 communicates with a respective conduit 14 and 16 via an outlet port 34 and 36. The housing 22 carries a reservoir assembly 40 for communicating fluid to each pressure chamber when the pair of pistons are in a rest position. The reservoir assembly 40 comprises a first part 42 of lightweight plastic material to carry fluid and a second part 44 of rigid construction for attachment to the housing 22. The first part 42 is fastened to the second part 44 by forming the plastic material around a portion of the second part.

The second part 44 defines a stepped bore 46 extending therethrough with end plugs 48 and 50 closing opposite ends of the stepped bore. A differential area piston 52 is movably disposed in the stepped bore 46 to separate a pair of cavities 54 and 56. The cavity 54 communicates with the outlet port 34 via a second part passage 58 and a housing passage 60, while the cavity 56 communicates with the outlet port 36 via a second part passage 62 and a housing passage 64. The plug 48 defines a stop 66 to limit movement of the differential area piston 52 in one direction while the plug 50 defines a stop 68 to limit movement of the differential piston in the opposite direction. Each plug is also provided with passages 67 and 69, respectively, to bleed air from the stepped bore, the cavities and the pressure chambers.

The first part 42 cooperates with the second part 44 to form a blind bore 70 and a reed switch 72 is disposed therein. Directly over the reed switch 72, the second part 44 forms a channel 74 receiving a float 76. The float moves up and down in the channel 74 as a function of the fluid level within the second part 44. An arcuate recess 78 is provided on the second part so that the reed switch 72 is disposed as close as possible to the wall of the stepped bore at an intermediate location between the end plugs 48 and 50.

The float 76 carries a first magnet 80 directly above the reed switch 72. The differential piston 52 carries a second magnet 82 normally spaced from the reed switch 72 toward the end plug 48 and a third magnet 84 normally spaced from the reed switch 72 toward the end plug 50. In the rest position illustrated, the third magnet 84 is abutting a shoulder 86 formed by the wall of the stepped bore 46. The differential area piston 52 slidably engages a first seal 83 normally biased against the third magnet 84 and carries a second seal 85 at the end adjacent plug 50. Therefore, the cavity 54 is isolated from the cavity 56.

Figure 2:
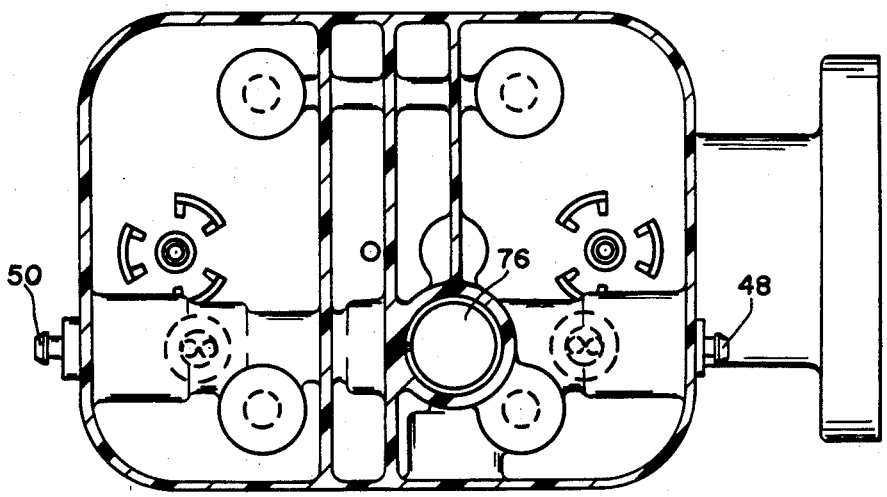
FIG. 2 is a cross section taken along line 2—2 of FIG. 1.
Figure 3:
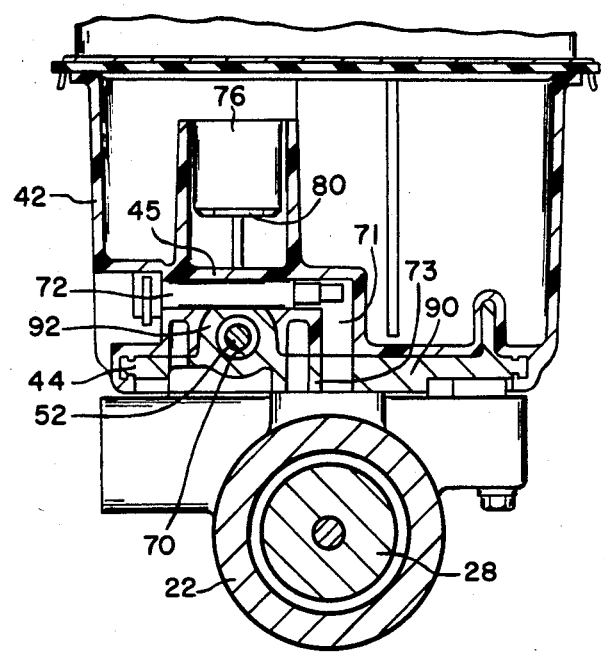
FIG. 3 is a cross section taken along line 3—3 of FIG. 2.
Figure 4:
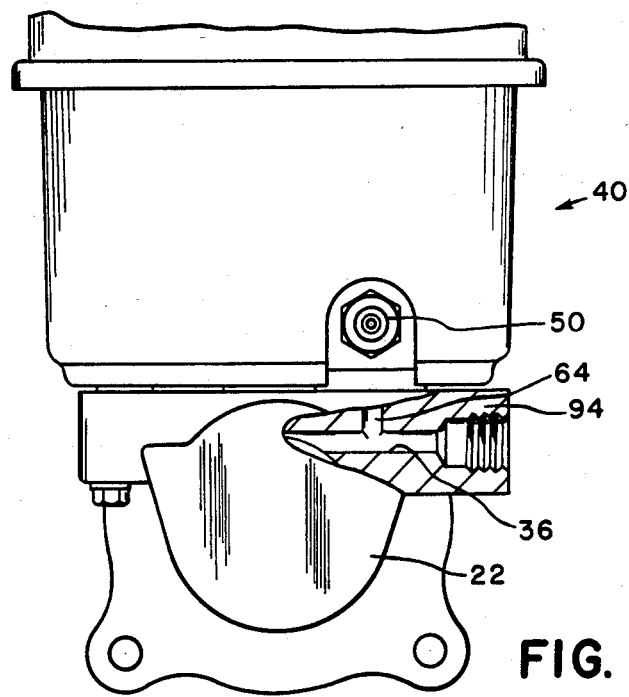
FIG. 4 is a left end view of FIG. 1.

As illustrated in FIG. 3, the second part 44 forms a substantially flat plate 90 with an upwardly extending boss 92 extending from end to end to define the stepped bore 46. From FIGS. 2–4, the boss 92 is also offset from a center line for the pair of pistons 26 and 28 in the direction of a pair of projections 94 (only one illustrated) forming the outlet ports 34 and 36.

During assembly, the reservoir assembly 40 is provided with the float 76, the reed switch 72 and the differential area piston 52 before attachment to the housing 22. The reed switch 72 is tested for accuracy in response to the float 76 positioning the magnet 80 adjacent the reed switch or the differential piston 52 positioning either magnet 82 or 84 directly below the reed switch. To facilitate insertion of the reed switch in the second bore 70, the second bore terminates in an opening 71, see FIG. 3 extending downward through the second part 44 via aperture 73. Consequently, air will not be trapped in the second bore 70 when the reed switch is inserted therein. The reservoir assembly 40 is then attached to the housing 22 and fluid added to the reservoir assembly and the housing. The plugs 48 and 50 are opened slightly to permit air to easily escape from the pressure chambers and the cavity via the passages 67 and 69.

During operation the brake pedal 10 is pivoted in a clockwise direction to impart movement to the pistons 26 and 28, thereby generating fluid pressure in the pressure chambers 30 and 32, the brake circuits 14 and 16, and the cavities 54 and 56. If each brake circuit 14 and 16 and each brake assembly 18 and 20 are sealed properly against fluid leakage, the pressure developed in the cavities 54 and 56 will be substantially the same. With the area of the differential area piston at seal 83 slightly less than the area of the stepped bore at seal 85, the differential piston will remain in its illustrated position to retain the magnets 82 and 84 equally spaced from the reed switch 72. In the alternative, if either brake circuit develops a leak so that fluid pressure will not be maintained in that circuit, the other circuit operates during braking to bias the differential area piston away from the illustrated position to abut stop 66 or 68 and align magnet 84 or 82 with the reed switch 72. In a well known manner once the magnet 84 or 82 is aligned with the reed switch 72, a warning circuit (not shown) associated with the reed switch 72 is activated to generate a warning signal for the operator of a vehicle.

The float 76 is carried by the fluid in the reservoir assembly 40 in spaced relation to the reed switch 72. When the fluid level falls below a predetermined setting, the float 76 will position the magnet 80 against the base 43 of part 42 adjacent the reed switch 72 to activate the associated warning circuit. The base 43 is provided with a transversely extending ridge 45 to form the second bore 70 and the magnet 80 is engageable with the ridge 45 when the fluid level is at or below the predetermined setting.

I claim:

1. A master cylinder comprising a housing movably receiving a pair of pistons in order to develop fluid pressure in a pair of pressure chambers during braking, a reservoir assembly carrying fluid for communication to the pair of pressure chambers in a rest position, a differential area piston exposed to the pair of pressure chambers and operable during braking to actuate a signal circuit in response to a failure mode in either pressure chamber, a float disposed in the reservoir assembly in order to also actuate the signal circuit in response to the fluid level in the reservoir assembly falling below a predetermined amount and a reed switch or the like controlling the signal circuit, characterized in that said reservoir assembly defines a first bore extending from a front end to a rear end for receiving said differential area piston, said reservoir assembly defines a second bore extending transversely to said first bore for receiving said reed switch or the like, said float carrying a first magnet for disposition adjacent said second bore when the fluid level is below the predetermined amount, and said differential piston carrying a second magnet and a third magnet which are normally equally spaced from said reed switch in the absence of a failure mode.

2. The master cylinder of claim 1 in which said reservoir assembly comprises a first part forming a fluid carrying container for the fluid and a second part adapted for attachment to said housing, said second part defining said first bore and said second part cooperating with said first part to define said second bore.

3. The master cylinder of claim 2 in which said second part comprises a substantially flat plate with an upwardly protruding boss forming said second bore.

4. The master cylinder of claim 3 in which said upwardly protruding boss is provided with a recess to accomodate disposition of said reed switch or the like therein.

5. The master cylinder of claim 1 in which said differential area piston is disposed above said housing, said reed switch or the like is disposed above said differential area piston and said float is disposed above said reed switch or the like in order to compactly arrange said differential area piston, said reed switch or the like and said float relative to said reservoir assembly.

6. The master cylinder of claim 1 in which said first bore receives a pair of end plugs closing said first bore and providing a path for bleeding air from said pair of pressure chambers.

7. The master cylinder of claim 6 in which said pair of end plugs are identical.

8. The master cylinder of claim 6 in which each of said pair of end plugs define a stop engageable with said differential area piston when said second or said third magnet is adjacent said reed switch.

9. The master cylinder of claim 1 in which said first bore extends completely through said reservoir assembly while said second bore terminates at about the middle of said reservoir assembly.

10. The master cylinder of claim 1 in which said reservoir assembly is separable from said housing and said differential area piston and said reed switch remain in cooperation with said reservoir assembly when the latter is separated from said housing.

11. The master cylinder of claim 1 in which said differential area piston and said first bore are offset relative to said pair of pistons.

12. The master cylinder of claim 1 in which said housing includes a pair of projections extending outwardly to form a pair of outlet ports, respectively, and said differential area piston and said first bore are offset in the direction of said pair of projections.

13. The master cylinder as claimed in claim 1, wherein said float is disposed in a channel defined within said reservoir assembly, said channel extending transversely of both said first bore and said second bore.

* * * * *